US012712961B1

(12) United States Patent
Li

(10) Patent No.: US 12,712,961 B1
(45) Date of Patent: Aug. 18, 2026

(54) PROACTIVE COMMUNICATION SERVICE EVENT SYSTEM

(71) Applicant: Zoom Communications, Inc., San Jose, CA (US)

(72) Inventor: Xu Hua Li, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 206 days.

(21) Appl. No.: 18/639,401

(22) Filed: Apr. 18, 2024

(51) Int. Cl.
*H04M 1/72403* (2021.01)
*H04W 24/08* (2009.01)

(52) U.S. Cl.
CPC ....... *H04M 1/72403* (2021.01); *H04W 24/08* (2013.01); *H04M 2201/42* (2013.01)

(58) Field of Classification Search
CPC ......... H04M 1/72403; H04M 2201/42; H04W 24/08
See application file for complete search history.

(56) References Cited

U.S. PATENT DOCUMENTS 6,170,067 B1 1/2001 Liu et al.
10,939,312 B2 * 3/2021 Wangler ................ H04W 24/04
11,522,769 B1 12/2022 Choudhary et al.
11,803,563 B2 10/2023 Wright et al.
2008/0167068 A1 * 7/2008 Mosleh ................ H04L 67/141 455/553.1
2009/0081994 A1 * 3/2009 Drobot .............. H04M 1/72448 455/412.2
2015/0139074 A1 * 5/2015 Bane .................. H04L 41/5009 370/328
2016/0242053 A1 * 8/2016 Leontiadis ............ H04L 41/065
2018/0132121 A1 * 5/2018 Correia e Costa ..... H04L 43/08
2019/0320328 A1 * 10/2019 Magzimof ............ H04W 16/22
2020/0374979 A1 * 11/2020 Rice ...................... H04W 48/18
2023/0129123 A1 4/2023 Wang

OTHER PUBLICATIONS

Nextiva, PBX Device Down? Here's How to Fix PBX System Issues (5 Steps), https://www.nextiva.com/blog/troubleshooting-pbx-phone-system.html, Julie Bai, Nov. 27, 2019, 4 pages.

* cited by examiner

*Primary Examiner* — Mohamed Barakat
(74) *Attorney, Agent, or Firm* — Young Basile Hanlon & MacFarlane. P.C.

(57) ABSTRACT

Proactive communication service event system includes aggregating phone data indicative of call connection quality for one or more phone devices associated with a customer of a software platform over a telephony network implemented by the software platform. A service event affecting the one or more phone devices is determined based on the aggregated phone data. The aggregated phone data and a representation of the service event is output for display within a graphical user interface. The graphical user interface is rendered at an administrator device of the customer. One or more telephony network resources, corresponding to the service event, of the customer are changed based on an input received via the graphical user interface.

20 Claims, 8 Drawing Sheets

PROACTIVE COMMUNICATION SERVICE EVENT SYSTEM

FIELD

This disclosure generally relates to an electronic communication system, and, more specifically, to proactive service event mitigation for the electronic communication system.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
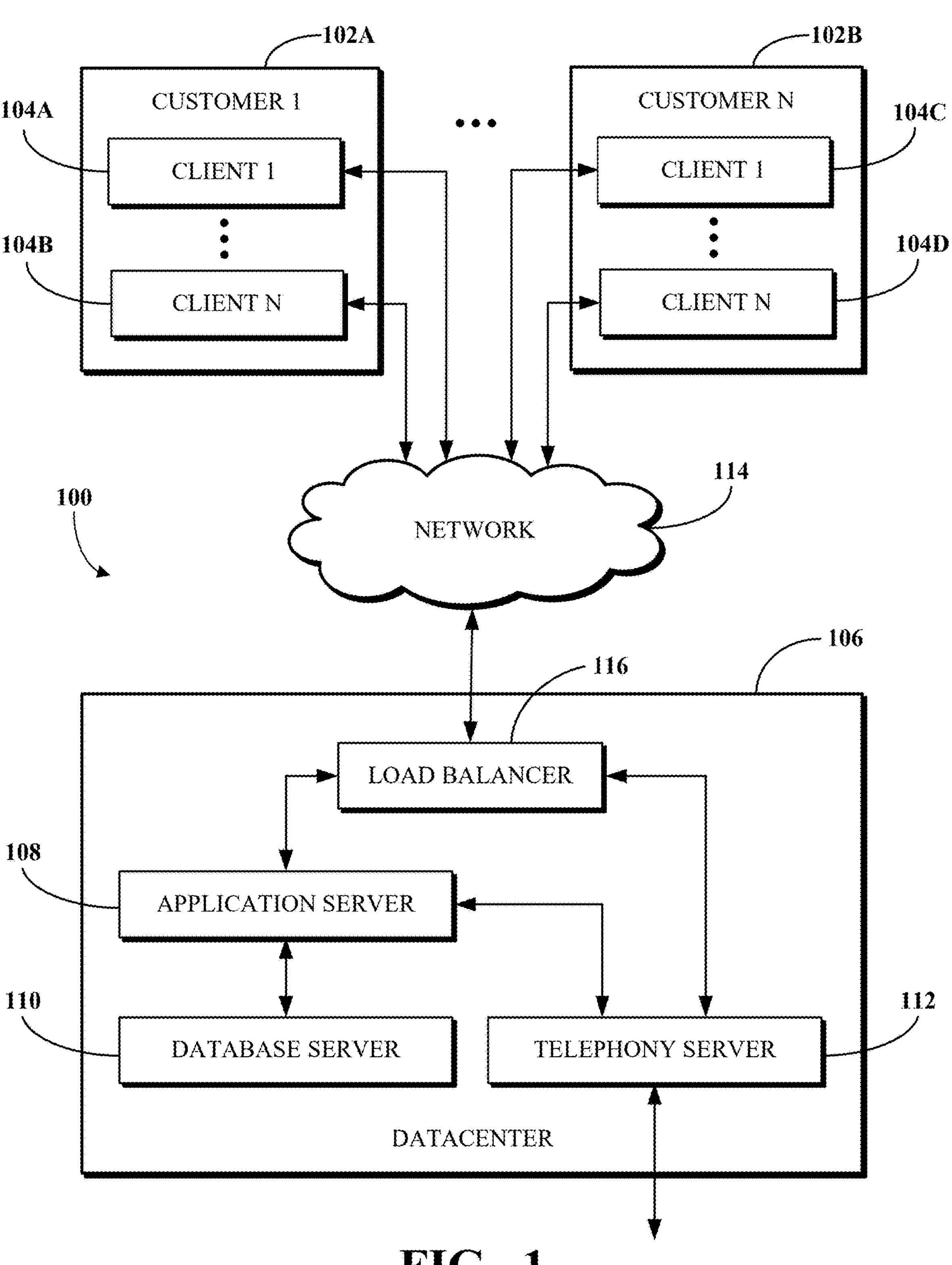
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

Telephony services, such as those provided in connection with a UCaaS or other software platform, are vulnerable to network issues that compromise call quality, such as jitter (variations in data packet arrival) and packet loss (data packets failing to reach their destination). These issues may resort in choppy, distorted, or unintelligible calls. Identifying and fixing the root cause of these problems (i.e., service events) involves an intricate analysis of network conditions and device configurations. This process is often manual and resource intensive.

Conventional approaches used to overcome these issues require information technology (IT) administrators to manually sift through vast amounts of data from various sources. However, this may cause significant delays in troubleshooting impacting the user experience and potentially causing business disruptions. Moreover, the manual nature of the troubleshooting process is prone to human error. An incorrect diagnosis can lead to misconfigurations and misconfigurations may exacerbate the issue or create new ones entirely. Additionally, as the number of connected devices increases, the troubleshooting process becomes increasingly unmanageable, which may lead to increase resource usage, further delays and potential service outages.

Implementations of this disclosure address problems such as these by providing a centralized dashboard that grants IT administrators immediate access to comprehensive phone data. This includes call logs, active call metrics (e.g., jitter, packet loss, latency), device configurations, and network topology information. By aggregating these previously disparate data sources, the solution eliminates time-consuming correlation efforts, accelerating the diagnostic process. The system leverages machine learning (ML) models trained on historical call data and known service event patterns. The ML models are used to analyze real-time data streams, flagging deviations from normal behavior that signal potential or emerging service issues. Additionally, the ML models aid in root-cause analysis, pinpointing the likely source of a problem by correlating anomalies across various data points. Furthermore, by referencing past successful resolutions, the system can suggest and implement tailored mitigation strategies.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for proactive service event mitigation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
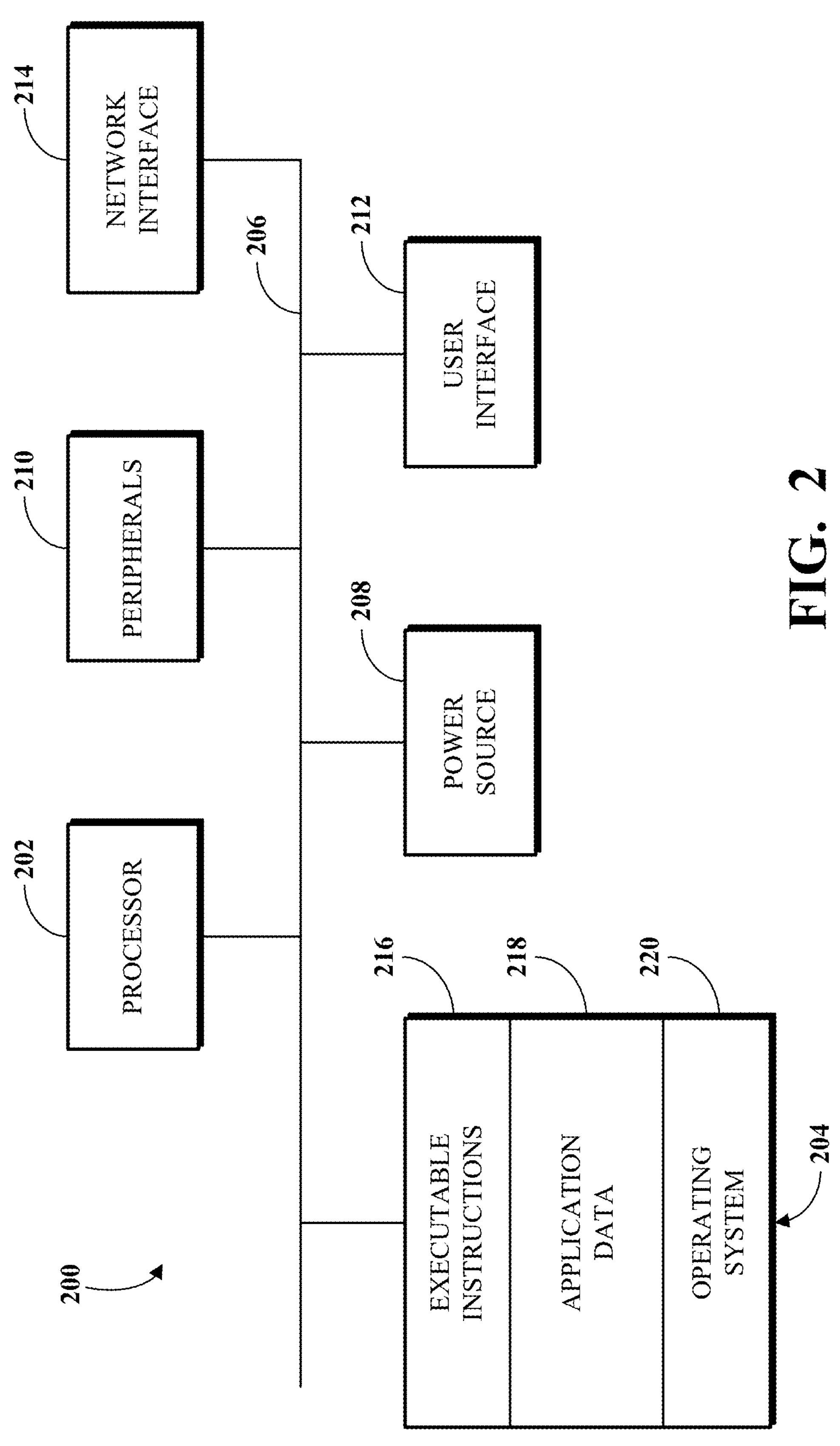
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
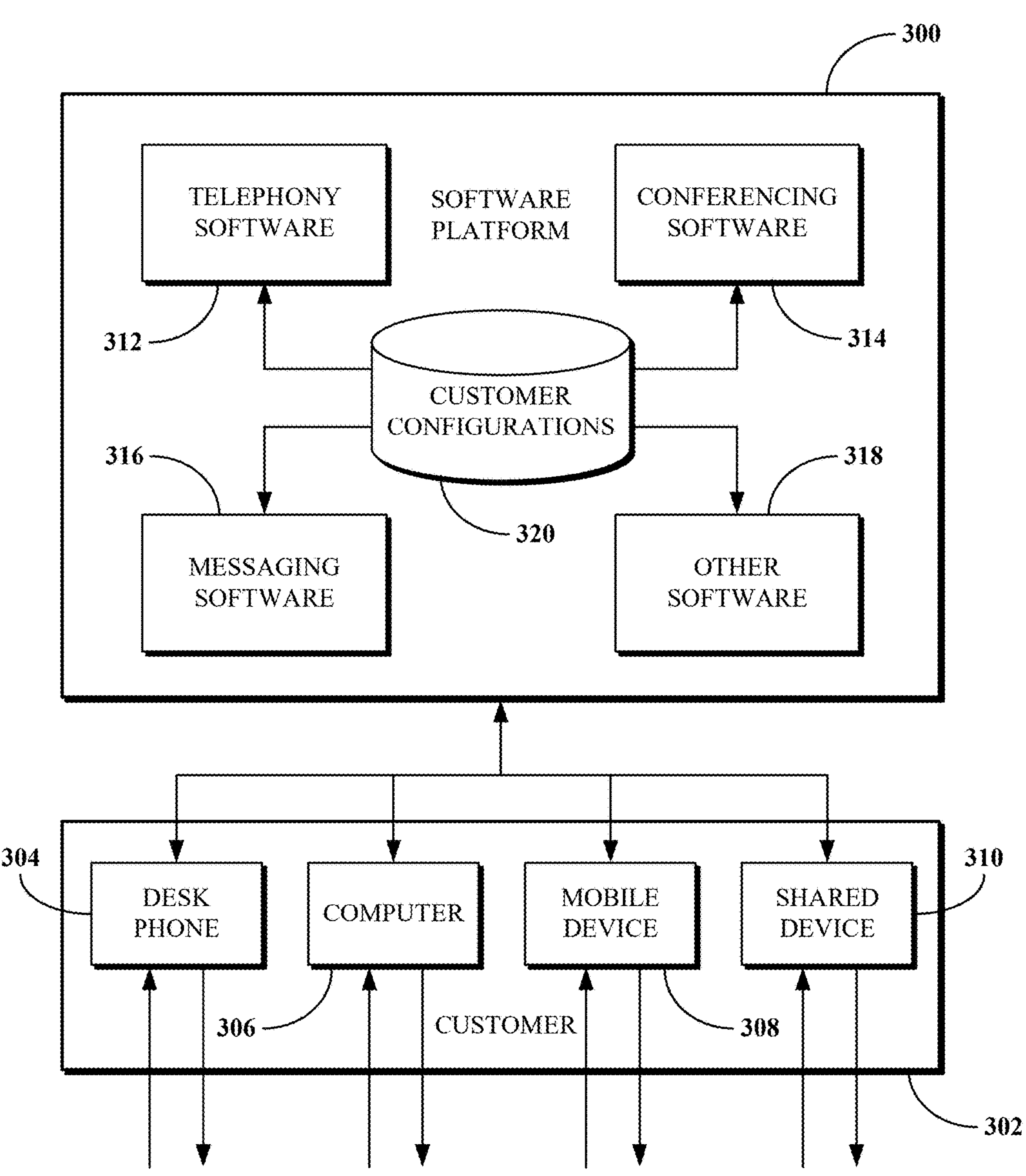
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include network monitoring software. The network monitoring software provides the software platform 300 with visibility into the health and performance of the underlying communication infrastructure by aggregating real-time data (e.g., bandwidth usage, device status, error logs) and enables the analysis and actioning of resolutions of events determined based on the aggregated data.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
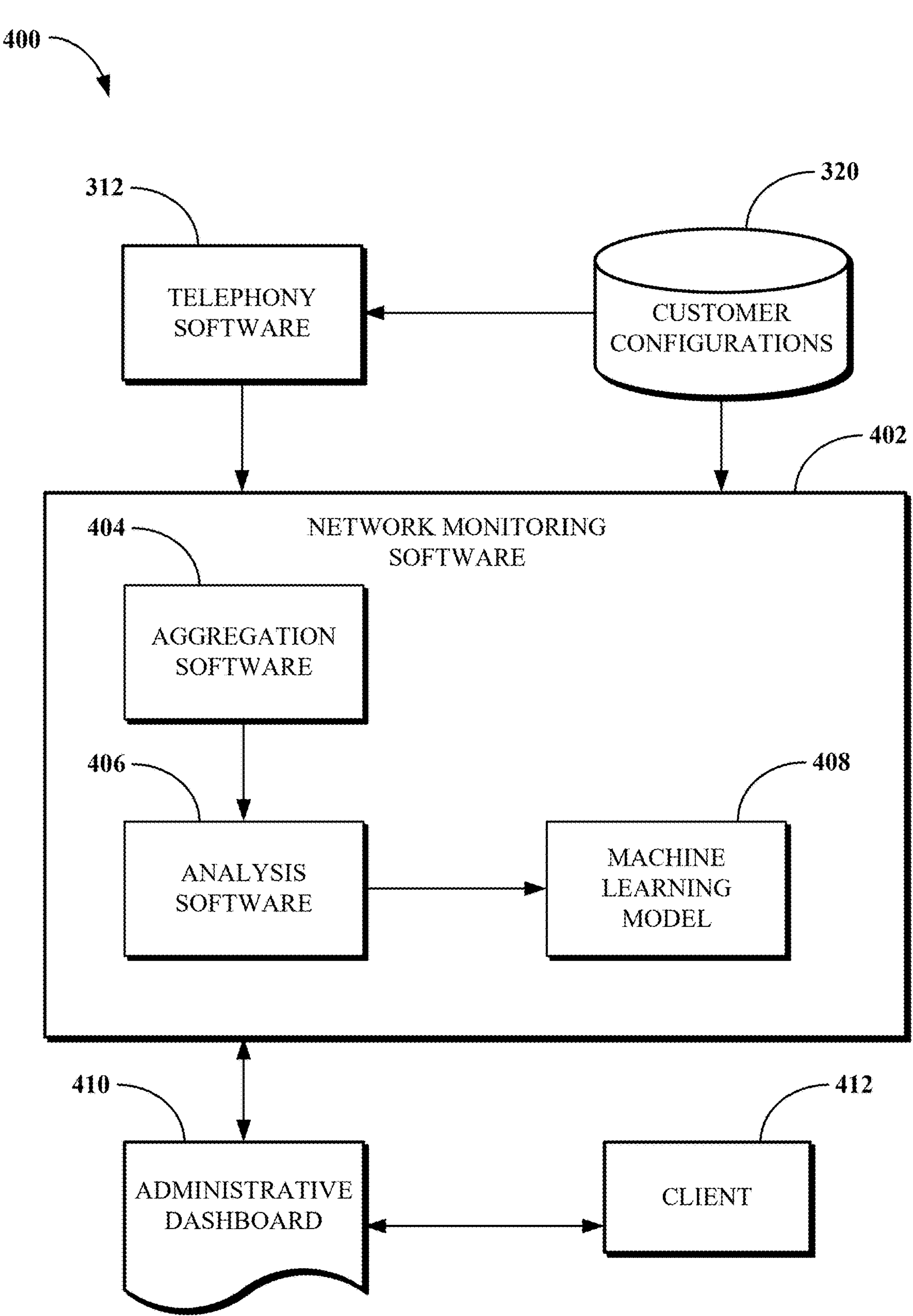
FIG. 4 is a block diagram of an example of a network monitoring software used to identify and remediate service events related to telephony services.

FIG. 4 is a block diagram of an example of a network monitoring software 402 implemented by the software platform 300 to identify and remediate service events related to telephony services. Telephony services encompass technologies and infrastructure enabling voice and often video communication over networks. Timely identification and remediation of service events affecting telephony service is crucial, as disruptions hinder business operations, frustrate customers, and, in critical sectors, potentially compromise safety. The network monitoring software includes an aggregation software 404, an analysis software 406, and a machine learning model 408. While the machine learning model 408 is shown as a part of the network monitoring software 402, the machine learning model may be a part of a separate module within the software platform 300. Alternatively, the machine learning model may be a part of an entity external to the software platform (i.e., a third-party).

The network monitoring software 402 is configured to receive network data from a telephony network such as the telephony software 312. This network data may include, but is not limited to, caller and recipient identifiers, time and duration of calls, call status (e.g., connected, failed, dropped, etc.), network information (e.g., IP address, carrier, etc.), quality metrics (e.g., jitter, packet loss, etc.), codec used, software version information, device models, and network settings, bandwidth utilization, Quality of Service (QoS) metrics, and/or error logs. For example, the telephony software 312 may record the timestamp of a call initiated by a first user of telephony services of the software platform 300 and received by a second user of the telephony services. During this call, the telephony software 312 may measure and record network metrics such as packet loss and bandwidth utilization. The network data may be recorded in call logs and transmitted to the network monitoring software 402. In some cases, the network monitoring software 402 may obtain the data other than via call logs. For example, the network monitoring software 402 may use one or more agents operating within computing infrastructure used to facilitate the telephony service (e.g., a server or client) to collect the relevant data.

The network monitoring software 402, using the aggregation software 404, may aggregate the call logs from the telephony software 312. The aggregation software 404 functions as a centralized hub for aggregating telephone network information (e.g., indicated within or otherwise by call logs) generated in connection with the use of various instances of the telephony software 312. The aggregation software 404 allows for a nuanced approach to data aggregation, allowing analysis at various granularities. Data can be aggregated based on customer accounts, providing a holistic view of telephony performance for a customer. It can also be aggregated geographically, enabling analysis of call quality within a specific office floor, an entire building, or even across multiple customer locations in a region (e.g., geographic region). Furthermore, the system can selectively aggregate data based on user or device attributes. The aggregation software 404 may use a combination of push and pull techniques to obtain the network information to aggregate. For instance, the telephony software 312 may be configured to periodically push new log entries to the aggregation software 404 via an application programming interface (API). Alternatively, the aggregation software 404 may actively poll various instances of the telephony software 312, for example, requesting log updates at defined intervals. During aggregation, the aggregation software 404 may standardize log formats to ensure data consistency regardless of the originating source. It may also enrich the data, for example, by correlating device identifiers with a central user database to add usernames or locations to the call logs.

The analysis software 406 transforms the aggregated call logs into actionable insights by proactively identifying potential service events. The service events may be defined based on thresholds set by customers and stored within the customer configurations 320 or automatically determined by the system based on historical data, industry-standard benchmarks, or dynamic analysis of network conditions. The analysis software 406 leverages the machine learning model 408 to identify potential service events. However, before analysis (i.e., evaluation) can occur, the data undergoes careful preprocessing performed by the analysis software itself. The preprocessing involves handling missing values (e.g., incomplete call logs, etc.), normalizing data ranges (e.g., scaling network metrics for consistency, etc.), and extracting relevant features (e.g., calculating average jitter over time windows, etc.). The machine learning model 408 is then trained using the preprocessed historical call log data, alongside records of known service events (e.g., outages, quality degradations, etc.). The training data can be derived from a single customer or aggregated from multiple customers. Through the training, the machine learning model 408 learns to recognize and evaluate subtle patterns and correlations within the data that precede such events.

The machine learning model 408 analyzes the preprocessed, aggregated network data to uncover hidden insights and patterns. Call logs, network metrics, and historical service event records, can be sifted through, searching for correlations and trends. By evaluating these relationships, the model learns to infer the likelihood of future service events. This allows the system to proactively identify potential issues before they significantly impact users, enabling preventative measures and maintaining optimal call quality. In some implementations, the machine learning model 408 can be used to forecast service events. The machine learning model 408 analyzes patterns within the preprocessed network data, looking for subtle trends such as gradually increasing jitter, packet loss, or call setup failures. By extrapolating (i.e., to extend or project observed patterns forward in time to predict future outcomes) these observed trends and comparing them against historical data where similar patterns led to service events, the model can predict the likelihood of an impending outage or quality degradation. This allows for proactive intervention, even if individual quality metrics have not yet reached critical alert levels. For example, the machine learning model 408 may detect a gradual increase in jitter and packet loss over a specific geographic area, combined with a rise in call volume during peak hours. These trends, when evaluated by the analysis software 406, could signal an impending network outage due to overload. The analysis software 406 may then generate alerts or warning with the administrative dashboard 410.

Additionally, the analysis software 406 may also provide recommendations for mitigation or resolution of the service event. The analysis software 406 could leverage past knowledge of successfully resolved service events, system configuration data, real-time network conditions, and the thresholds defined by customers to make these suggestions. For example, if impending network congestion is predicted, the software might recommend rerouting calls to underutilized paths, temporarily decreasing video quality to conserve network bandwidth, or prioritizing critical calls based on user profiles.

In some embodiments, the output (i.e., recommendation) produced by the analysis software 406 may be used to generate an automated response such that the service event can be resolved without human interaction. For example, if the model detects a sharp increase in packet loss within a specific region, potentially caused by network congestion, it might trigger an automated script. The automated script could reroute lower-priority traffic to alternate network paths or temporarily decrease video quality for non-critical calls in that area. Such an automated response can mitigate the impact of the service event, preventing widespread call quality degradation without requiring immediate human intervention. Additionally, the scope and nature of the automated response can be configurable allowing IT administrators to maintain an appropriate level of control and oversight.

In some embodiments, the analysis software 406 can detect regional service events (e.g., service events impacting a region). For example, the analysis software 406 may detect a regional spike in dropped calls and poor audio quality. The regional spike may indicate a potential network connectivity issue. The network monitoring software 402 can then analyze the status of the SBCs within the affected region, potentially revealing issues like high load or configuration errors. This targeted analysis enables IT admins to take corrective actions, such as rerouting traffic away from overloaded SBCs, adjusting the configurations of affected SBCs, or even initiating investigations with network providers to resolve upstream connectivity problems. Alternatively, in response to detecting a regional service event, an automated response can by generated that can resolve the service event without human interaction. In either case, an integrated approach of combining location data with SBC status analysis, facilitates rapid troubleshooting and service restoration.

The administrative dashboard 410 provides a visual interface for software users, for example, IT administrators, to access and interact with the aggregated call logs. The visual interface may be a graphical user interface presented by the software platform 300. The administrative dashboard 410 may be rendered at an administrator device used by an IT administrator. The IT administrator may be a client 412. The IT administrator may represent the client 412 (e.g., be an employee of the client 412, be contracted by the client 412, etc.). The client 412 may be the client 104A-104D of FIG. 1. The administrative dashboard 410 might feature customizable views, including historical log summaries with filters for time ranges, devices, or users. The administrator dashboard 410 could display active call information (i.e. active calls), color-coded by quality metrics (e.g., green for good call quality, red for high packet loss). Drill-down capabilities would allow IT administrators to view detailed logs for specific calls, providing caller and recipient information, timestamps, network metrics throughout the call's duration, and any troubleshooting actions taken. The administrative dashboard 410 may also include aggregated statistics on call volume, average call quality, and trends over time, helping IT administrators assess network health and spot potential trouble areas.

In some embodiments, the administrative dashboard 410 may include an interface to a chatbot. The chatbot may act as a virtual assistant, guiding IT administrators throughout the troubleshooting process. Leveraging the knowledge base available to the network monitoring software 402, the chatbot can offer contextual guidance based on the specific service event, suggesting relevant troubleshooting steps. The chatbot can even provide step-by-step support, prompting the IT administrator for important information and clearly explaining actions. Additionally, if the service event exceeds the capabilities of the chatbot, the chatbot can streamline escalation processes by seamlessly connecting the IT administrator to the appropriate support channels, enabling timely resolution of complex service events.

The administrative dashboard 410 may include visual representations of service events, providing intuitive alerts to IT administrators. These representations could take various forms, such as a geographic heatmap highlighting areas with high concentrations of degraded calls, timelines pinpointing the onset and potential escalation of an event, or graphs visually correlating metrics (e.g., jitter measurements, packet loss measurements) with the occurrence of service events. The administrative dashboard 410 may leverage color-coding, annotations, and dynamic updates to clearly convey the severity, location, and potential impact of a service event. These visual representations may facilitate rapid situational awareness and guide troubleshooting actions.

The administrative dashboard 410 may visually present a recommendation to resolve or mitigate identified service events. The recommendation could be displayed as a pop-up alert or integrated into the visual representation of the service event. The visual representation of the service event could incorporate single-click or similar prompts directly linked to the recommendation. This allows the IT administrator to execute approved solutions with minimal delay. Icons, symbols, or textual annotations can be used to convey the recommended action(s), such as rerouting affected calls, prioritizing specific traffic, or notifying impacted users. In addition, to the recommendation, the administrative dashboard can display concise explanations derived from the analysis output by the machine learning model 408. The explanations can outline the reasoning behind a recommendation or highlight specific data points supporting it. For complex scenarios, the administrative dashboard 410 may provide a ranked list of recommendations, potentially accompanied by brief justifications or estimated success probabilities derived from the analysis software's internal modeling. The visual presentation of the recommendation may streamline the decision-making process of the IT administrator while providing insights into the reasoning behind the suggested solution (i.e., recommendation).

In some embodiments, the network monitoring software 402 can automatically generate a task or a ticket within a ticketing system (e.g., JIRA, ServiceNow, etc.). This automation can be triggered by predefined criteria, such as the severity of the service event or the recommended action. For example, upon detecting a critical service event, the network monitoring software 402 can create a high-priority ticket within the ticketing system, automatically populating relevant details like the event type, location, and potential impact. This can immediately notify the appropriate IT support team and expedite the resolution process. Additionally, the ticket could include details extracted from the analysis performed by the machine learning model 408 analysis, such as suggested troubleshooting steps or justifications for the urgency rating. The integration between the network monitoring software 402 and the ticketing system streamlines workflow, enables timely attention to critical issues, and provides support teams with valuable context to resolve service events efficiently.

In some embodiments, the network monitoring software 402 can automatically trigger alerts or notifications based on service event severity. The alerts can be pushed to designated IT personnel via email, text message, or integrations with other monitoring tools. The alerts can be based on detected service events and customizable severity thresholds. The alerts can be proactively triggered and tailored to different levels of urgency. For instance, a minor quality degradation might generate a low-priority email alert to relevant personnel (e.g., the IT administrator). On the other hand, a critical event, such as an impending network outage, could trigger immediate text message notifications to designated personnel and even initiate predefined mitigation procedures.

For example, if the network monitoring software 402 detects a sharp rise in call connection failures, indicating an imminent localized outage within a branch office of a customer, a predefined mitigation procedure can be initiated. The predefined mitigation procedure can include but is not limited to immediate text message alerts to on-call personnel, automated rerouting of call traffic to minimize user impact, and potentially even tailored notifications to impacted customers. This automated, proactive approach enables swift action to mitigate service disruptions and expedite problem resolution.

Figure 5:
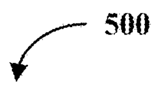
FIG. 5 is a flowchart of an example of a technique for identifying and remediating service events related to telephony services.
Figure 5:
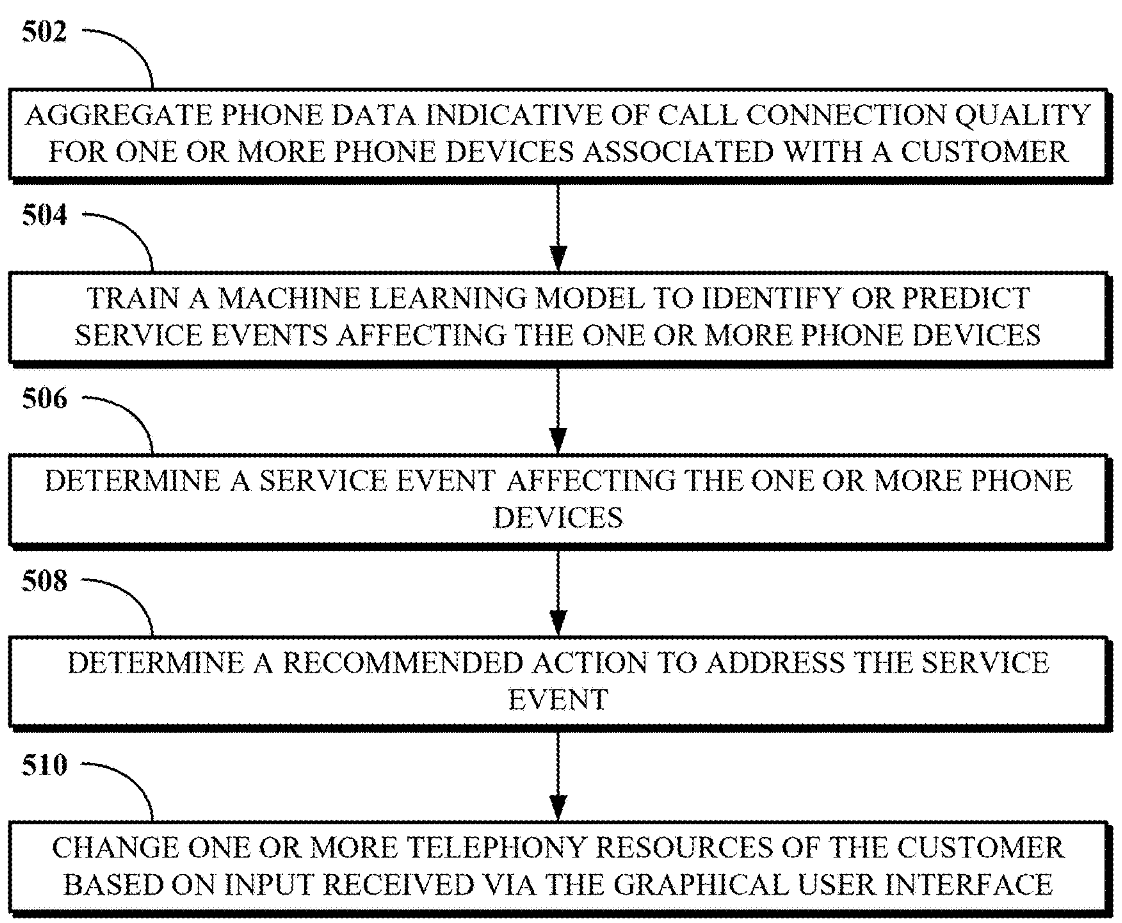

To further describe some implementations in greater detail, reference is next made to examples of techniques which may be performed by or using a system for proactive service event mitigation for electronic communication system. FIG. 5 is a flowchart of an example of a technique 500 for identifying and remediating service events related to telephony services. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500, or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations of the technique 500 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At operation 502, the phone data indicative of call connection quality is aggregated for one or more phone devices associated with a customer. The phone data includes, but is not limited, to call logs (e.g., caller/recipient identifiers, timestamps, call duration, status, etc.), active call metrics (e.g., jitter, packet loss, network information, etc.), and device configuration data (e.g., software versions, models, settings, etc.). The phone data indicative of call connection quality may indicate poor call connection quality, or otherwise. For example, the aggregation software 404 of FIG. 4 retrieves call logs detailing recent packet loss percentages and timestamps from multiple phone devices linked to a specific customer account. The network monitoring software 402 then integrates the data, preparing it for further analysis to identify patterns or trends potentially signaling impending service quality issues.

At operation 504, a machine learning model is trained to identify or predict service events affecting the one or more phone devices of the customer. The machine learning model may be the machine learning model 408 of FIG. 4. The training of the machine learning model may happen within the analysis software 406 of FIG. 4. Training the machine learning model involves transmitting preprocessed, aggregated phone data and historical records of service events to the machine learning model. The aggregated data can be collected by the aggregation software 404 of FIG. 4 and used by the analysis software 406. Additionally, the specific thresholds of the customer are incorporated during the training process. The analysis software 406 retrieves the thresholds of the customer from the customer configurations 320 of FIG. 4. The machine learning model 408 utilizes the provided data to learn subtle patterns and correlations within the data that signal potential outages, quality degradation, or breaches (i.e., service events) of the quality parameters defined by the customer.

At operation 506, a service event is determined to be affecting the one or more phone devices. That is, the analysis software 406 uses the machine learning model 408 to determine whether a service event is affecting one or more phone devices of the customer. The analysis software 406 analyzes incoming aggregated phone data from the aggregation software 404. The analysis includes, but is not limited to, real-time metrics, historical trends, and customer-specific quality thresholds (such as the thresholds stored in the customer configurations 320). Upon detecting patterns or anomalies recognized as precursors to service events, the analysis software 406 flags the issue.

At operation 508, a recommended action to address the service event is determined. That is, the analysis software 406, determines one or more recommended actions to mitigate or resolve the identified service event. The recommendation process utilizes the machine learning model 408, historical data on successful resolutions, real-time network conditions, and customer-specific configurations and priorities. The recommended action encompasses a range of actions. For example, rerouting calls to less congested network paths, prioritizing critical call traffic based on user profiles (e.g., prioritizing a high priority phone device over a low priority phone device), temporarily reducing audio/video quality to conserve network bandwidth, or proactively notifying impacted users. The administrative dashboard 410 displays the recommended action. Additionally, an explanation or supporting justification can be displayed along with the recommended action to enhance the decision-making process of the IT administrator.

In another more comprehensive but non-limiting example, the customer with a distributed workforce may start to experience intermittent audio dropouts and poor call quality, primarily impacting users in a specific region. The network monitoring software 402 via the aggregation software 404 may continuously collect call log information, active call information (e.g., active call metrics), and device configuration data from the affected devices. At the same time, the analysis software 406, via the machine learning model 408, identifies a correlation. The analysis software 406 establishes a link between the timing of audio issues, an increase in network latency within the impacted region, and historical service event data. The administrative dashboard 410 visually represents the service event on a map, highlighting the impacted region (e.g., a hot zone). It also displays trend graphs showcasing a rise in latency measurements and packet loss over time, coinciding with the reported call quality complaints. Summarized call logs pinpoint specific dropped calls and their timestamps. The administrative dashboard 410 may even provide a recommended action, such as rerouting traffic, notifying users based on priority, or initiating further investigation of a specific network segment. This comprehensive, visual presentation may empower the IT administrator to quickly grasp the situation, investigate the root cause of the congestion, and take proactive steps to minimize its impact on the customer's experience.

At operation 510, a change is made to one or more telephony resource of the customer based on an input received via the graphical user interface. That is, based on the input received via the administrative dashboard 410, from the IT administrator, a change to one or more telephony network resources associated with the customer may be initiated. These changes are designed to implement the selected resolution strategy (i.e., recommended action) for the identified service event. The technique 500 might interact directly with network management systems to enact actions such as rerouting calls, adjusting network bandwidth allocation, or prioritizing specific traffic types. Alternatively, the technique 500 could generate instructions or scripts for the IT administrator to execute.

For example, the analysis software 406 may detect impending network congestion in the call traffic of a high priority employee, the analysis software 406 may recommend temporarily downgrading video call quality to conserve network bandwidth. On the administrative dashboard 410, the IT administrator may see a visual representation of the recommendation (i.e., recommended action), as well as a graph indicating the projected impact on bandwidth usage. The IT administrator may approve the recommended action of downgrading the video quality via the administrative dashboard 410. The network monitoring software 402 may automatically issue commands to the relevant network devices to enforce the video quality reduction for the specified devices of the customer. Alternatively, the network monitoring software 402 may generate a configuration script for the IT administrator to execute.

Figure 6:
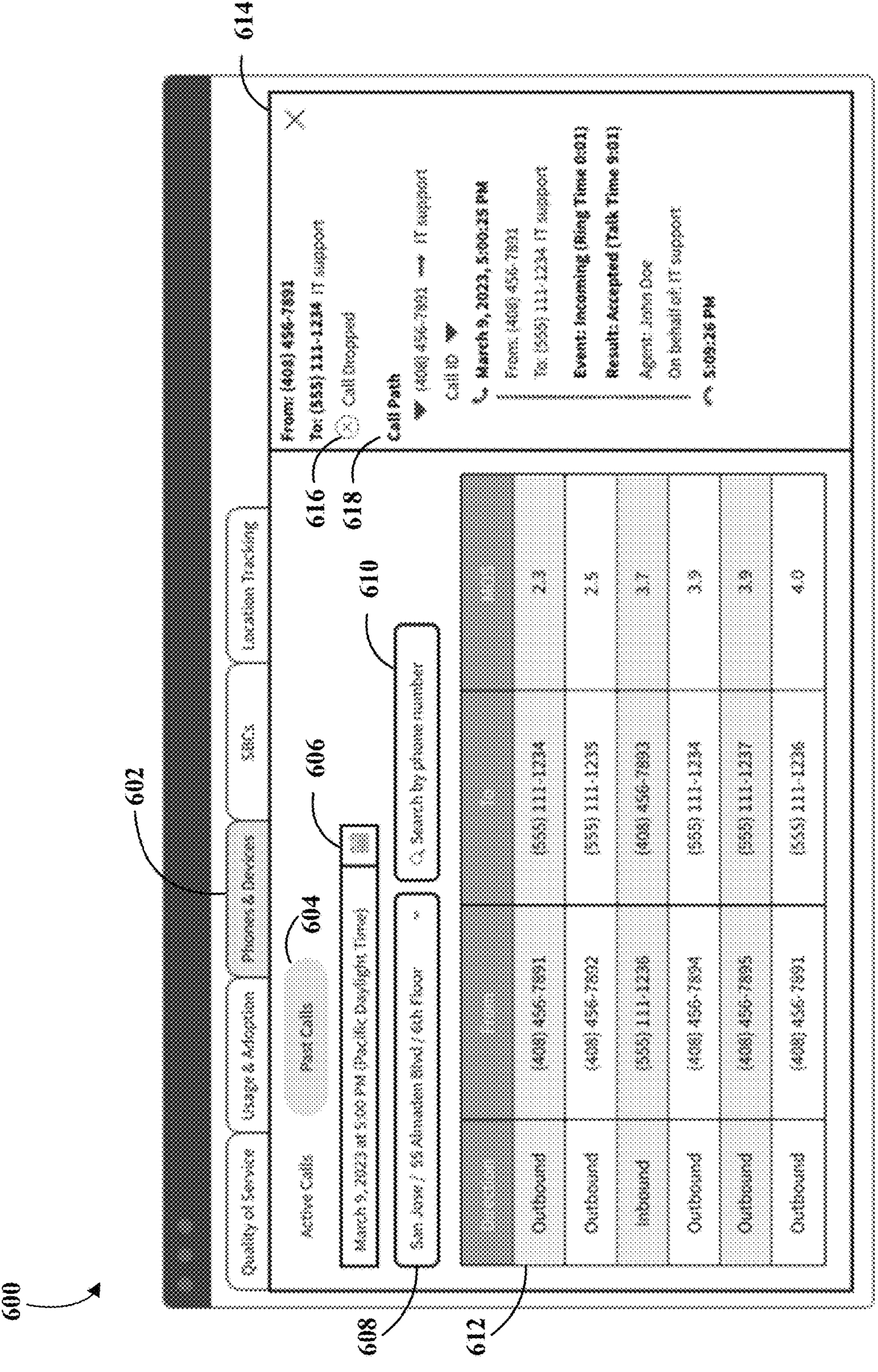
FIG. 6 is an illustration of an example graphical user interface (GUI) for an administrative dashboard.

FIG. 6 is an illustration of an example GUI 600 for an administrative dashboard. The administrative dashboard may be the administrative dashboard 410 of FIG. 4. The graphical user interface includes navigation tabs 602, a call type filter 604, a date time filter 606, a location filter 608, a search box 610, a call log 612, a details panel 614, a call status indicator 616, and a call path 618. The GUI provides a centralized platform for IT administrators to monitor call activity, diagnose issues, and identify service event trends and view recommendations from the analysis software 406. The GUI can also display automated resolutions and mitigation steps that have been proactively implemented by the network monitoring software 402.

The GUI incorporates various visual elements to streamline information access and analysis. The navigation tabs 602 allow quick switching between different functionalities within the dashboard (e.g. switching from "Quality of Service" to "Phones & Devices" with a call path view of the particular call log). The call type filter 604, the date time filter 606 and the location filter 608 enable administrators to focus on specific call types, date ranges, or locations respectively. A search box 610 offers additional options for targeted searches within the call log 612. The call log 612 displays an ordered list of calls, including but not limited to details such as call direction, source and destination numbers, and mean opinion score (MOS). The call direction indicated the directionality of the call (e.g., incoming, outbound). The MOS is a measure or metric used to measure VOIP call quality. The MOS is between 1 and 5, where 5 indicates the best VOIP call quality and 1 indicates the worst VOIP call quality.

To the right of the call log 612, the details panel 614 provides more in-depth information about a selected call. The detail panel 614 may include call quality metrics, call recording options, or annotations documenting troubleshooting efforts. Visual cues, such as the call status indicator 616, are used to highlight potential issues (e.g., dropped calls) that require attention. The call path 618 visually represents the routing path taken by a specific call, as well as a time and duration of different stages (e.g., ringing, talking, etc.) of the call. The call path 618 can aid in network troubleshooting tasks for the selected call.

Figure 7:
FIG. 7 is an illustration of a map of a customer premise location.
Figure 7:
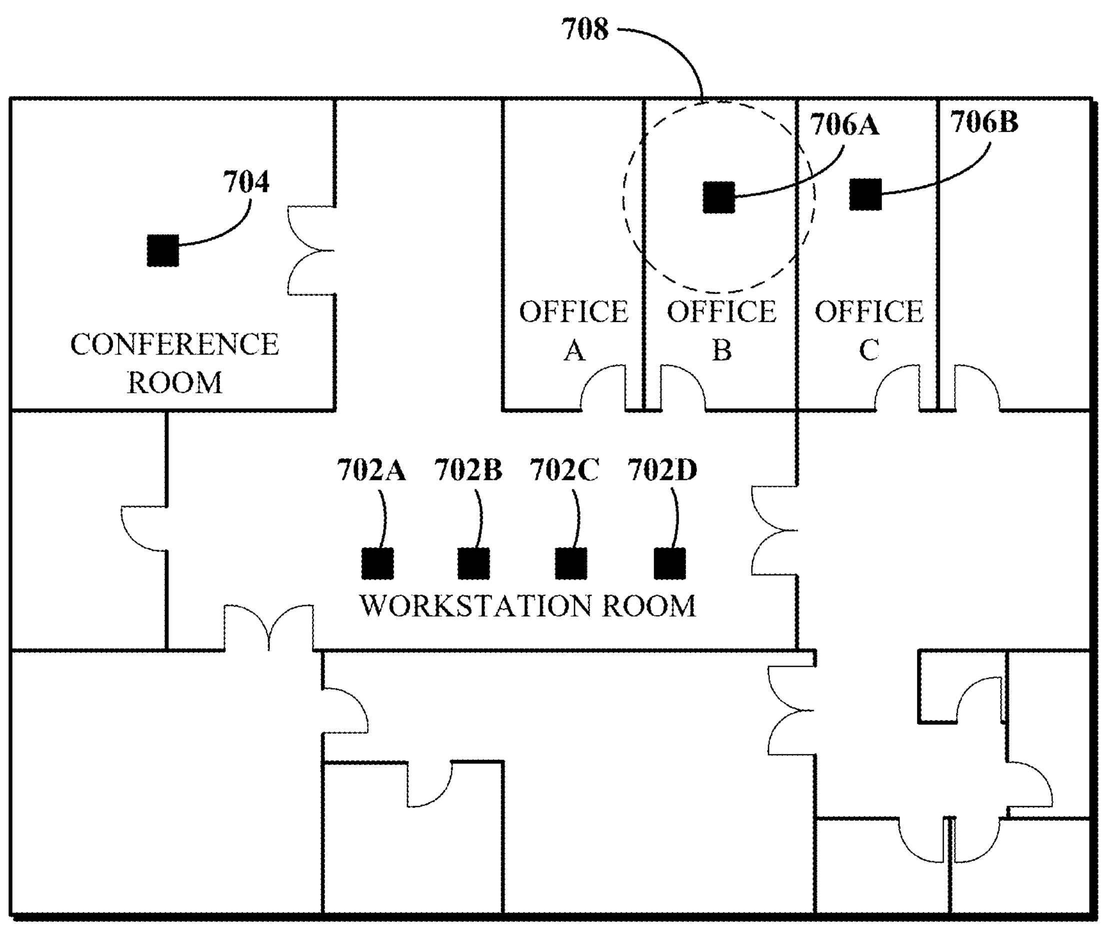

FIG. 7 is an illustration of a map 700 of a customer premise location. The map 700 represents a floorplan of a customer premise location. The floorplan depicts the layout of various workspaces within the location including a workstation room with client workstations 702A-D, a conference room with a conference room phone 704, offices A-C with office phones 706A-B, and service event indicator 708. This visual representation can be useful for identifying the physical distribution of telephony resources and any potential correlations with service events. The map 700 can be displayed within the administrative dashboard 410 as described above in relation to operation 508 of FIG. 5.

The map 700 includes symbols to designate specific types of office spaces. For instance, a designated area marked "Workstation Room" contains client workstations labeled 702A-D. The client workstations 702A-D include devices used by customer employees for making and receiving calls. The devices included within the client workstations 702A-D may be the desk phone 304 or the computer 306 of FIG. 3. Similarly, an area labelled "Conference Room" is shown to include a conference room phone 704. The conference room phone 704 may be the shared device 310 of FIG. 3. Finally, private offices denoted as "Office A," "Office B," and "Office C" with office phones 706A and 706B. The office phone 706A-B may be the deck phone 304 of FIG. 3. A service event indicator 708 shows how the system can visually represent the location of identified service events on the map, potentially correlating them with specific workstations, conference rooms, or offices. This information can be crucial for pinpointing the source of service disruptions and expediting troubleshooting efforts.

The map 700 can enable swift mitigation of service events by visually highlighting the locations of service events on the map. The map empowers IT administrators to quickly identify the affected areas and prioritize troubleshooting efforts accordingly. The map also facilitates efficient resource allocation. For instance, if a service event centers around the workstation room, IT administrators can understand the scale of the issue and deploy targeted solutions like remote reboots or call rerouting. When integrated with device management software, the map can provide remote access to specific devices. This allows for direct configuration changes or diagnostic tests without requiring physical presence at a workstation or office. Ultimately, the map visualization helps IT administrators geographically contextualize service events, accelerating problem diagnosis and enabling faster, more focused solutions for rapid service restoration.

The map 700 can further streamline troubleshooting by visually correlating service events with the locations of high priority users. The map 700 might incorporate data from customer configurations (such as the customer configurations 320 of FIG. 3) or a user directory to designate specific individuals or groups as high priority users. For example, C-level executives, critical customer support teams, or emergency response personnel may be classified as high priority users. By integrating user priority information into the map service events impacting these high priority employees can be highlighted. This visual representation empowers IT administrators to immediately prioritize troubleshooting efforts, ensuring minimal disruption for users whose roles demand highly reliable telephony service.

Figure 8:
FIG. 8 is a flowchart of an example of a technique for displaying output to an administrative dashboard.
Figure 8:
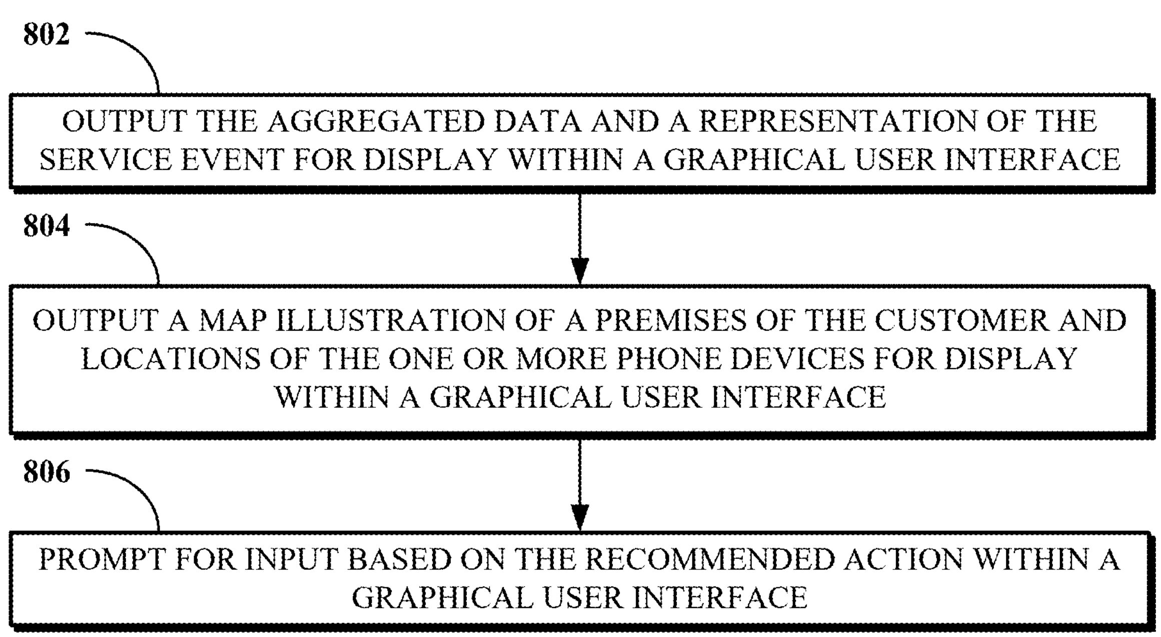

FIG. 8 is a flowchart of an example of a technique 800 for displaying output to an administrative dashboard. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used.

Furthermore, not all illustrated steps or operations may be required to implement a technique in accordance with the disclosed subject matter.

At operation 802, aggregated data and a representation of the service event is output for display within a graphical user interface. That is, the analysis software 406 prepares both the aggregated phone data and a visual representation of the identified service event for display within the administrative dashboard 410. The aggregated data may be the aggregated data as described in relation to operation 502 of FIG. 5. The administrative dashboard 410 leverages various display elements to convey critical information. This includes, but is not limited to, call logs with relevant timestamps and quality metrics, historical trends associated with the issue, and a geographic or location map pinpointing affected devices or network segments. Visual cues, such as color-coding or dynamic animations, further highlight the severity and potential impact of the service event.

At operation 804, a map illustration of the premises of the customer and locations of the one or more phone devices is output for display within a graphical user interface. In other words, the network monitoring software 402, generates a map of the customer's premises, overlaid with the locations of their associated phone devices. This map is then prepared for display within the administrative dashboard 410. The map visualization leverages location data derived from network information collected by the network monitoring software 402 or obtained from additional customer configuration data (such as the customer configurations 320). This enhances troubleshooting in scenarios where physical device location is relevant. For example, the map illustration aids in pinpointing a localized signal interference source disrupting specific devices. Additionally, the map assists in tracing network connectivity issues within the customer's internal wiring or infrastructure.

At operation 806, input based on a recommended action is prompted for within a graphical user interface. In other words, the network monitoring software 402 may solicit input, regarding the recommended action, from the IT administrator via the administrative dashboard 410. The recommended action may be the recommended action as described above in relation to operation 508 of FIG. 5. Instead of merely displaying the recommended action, the administrative dashboard 410 can present a dialog box or interactive element. This allows the IT administrator to confirm execution, reject, or request modifications to the recommended action. For example, the IT administrator might opt to delay the resolution if it conflicts with other scheduled maintenance. The input can allow for oversight and control, particularly in scenarios where automated mitigation actions (i.e., recommended actions) could have far-reaching consequences.

While the implementations of this disclosure have been described in the context of telephony services and general teleconferencing, it is to be understood that other embodiments are not limited to such applications. The features and techniques described herein can be readily adapted and applied to video conferencing services as well.

Aspects such as network monitoring, service event detection, automated troubleshooting, and user-centric dashboards, remain equally relevant in the video conferencing domain. By incorporating video quality metrics alongside traditional telephony measurements, the system can proactively identify and address issues that may hinder user experience during video calls. This could include detecting and mitigating problems like excessive packet loss, jitter, or insufficient bandwidth, all of which can significantly impact video conferencing quality. Furthermore, the visual representation of service events on a map can be extended to encompass video conferencing endpoints (e.g., video conferencing room systems, user devices with video conferencing capabilities, etc.), allowing for automated mitigation strategies to be triggered or IT administrators to pinpoint the location of potential video conferencing issues. Overall, the disclosed features and techniques can be effectively leveraged to enhance the performance, reliability, and manageability of video conferencing services.

The implementations of this disclosure correspond to methods, non-transitory computer readable media, apparatuses, systems, devices, and the like. In some implementations, a method comprises aggregating, over a telephony network implemented by a software platform, phone data indicative of call connection quality for one or more phone devices associated with a customer of the software platform; determining, based on the aggregated phone data, a service event affecting the one or more phone devices; outputting, for display within a graphical user interface rendered at an administrator device of the customer, the aggregated phone data and a representation of the service event; and changing, based on an input received via the graphical user interface corresponding to the service event, one or more telephony network resources of the customer. In some implementations, a non-transitory computer readable storage device including program instructions that, when executed by a processor cause the processor to perform operations the operations comprising aggregating, over a telephony network implemented by a software platform, phone data indicative of call connection quality for one or more phone devices associated with a customer of the software platform; determining, based on the aggregated phone data, a service event affecting the one or more phone devices; outputting, for display within a graphical user interface rendered at an administrator device of the customer, the aggregated phone data and a representation of the service event; and changing, based on an input received via the graphical user interface corresponding to the service event, one or more telephony network resources of the customer. In some implementations, a system, comprising a memory subsystem configured to store instructions; and processing circuitry configured to execute instructions to aggregate, over a telephony network implemented by a software platform, phone data indicative of call connection quality for one or more phone devices associated with a customer of the software platform; determine, based on the aggregated phone data, a service event affecting the one or more phone devices; output, for display within a graphical user interface rendered at an administrator device of the customer, the aggregated phone data and a representation of the service event; and change, based on an input received via the graphical user interface corresponding to the service event, one or more telephony network resources of the customer.

In some implementations of the method, non-transitory computer readable medium, or system, determining the service event affecting the one or more phone devices comprises identifying, using a machine learning model trained to evaluate the aggregated phone data, a pattern in the call connection quality for the one or more phone devices; and corresponding, using the machine learning model, the pattern to the service event.

In some implementations of the method, non-transitory computer readable medium, or system, determining the service event affecting the one or more phone devices comprises forecasting the service event by extrapolating a trend from the aggregated phone data.

In some implementations of the method, non-transitory computer readable medium, or system, determining the service event affecting the one or more phone devices comprises determining that the aggregated phone data exceeds a threshold corresponding to the service event, wherein the threshold is defined for the customer.

In some implementations of the method, non-transitory computer readable medium, or system, the method comprises, the operations comprise, and the processing circuitry is configured to execute instructions for outputting, for display within the graphical user interface, a map illustration of a premises of the customer and locations of the one or more phone devices within the map illustration.

In some implementations of the method, non-transitory computer readable medium, or system, the method comprises, the operations comprise, and the processing circuitry is configured to execute instructions for training a machine learning model to identify or predict service events by evaluating patterns in data communicated over the telephony network via multiple customers of the software platform.

In some implementations of the method, non-transitory computer readable medium, or system, the method comprises, the operations comprise, and the processing circuitry is configured to execute instructions for determining a recommended action to perform to address the service event; and prompting, within the graphical user interface, for the input based on the recommended action.

In some implementations of the method, non-transitory computer readable medium, or system, the service event corresponds to a poor call connection quality for a high priority phone device of the one or more phone devices, and wherein changing the one or more telephony network resources of the customer comprises decreasing network bandwidth available to a low priority phone device associated with the customer; and increasing network bandwidth available to the high priority phone device.

In some implementations of the method, non-transitory computer readable medium, or system, the aggregated phone data corresponds to at least one of call log information, active call information, jitter measurements, packet loss measurements, latency measurements, or software version information for the one or more phone devices.

In some implementations of the method, non-transitory computer readable medium, or system, the method comprises, the operations comprise, and the processing circuitry is configured to execute instructions for, generating a map of a premises of the customer, wherein the map includes locations of the one or more phone devices; and outputting the map to the graphical user interface.

In some implementations of the method, non-transitory computer readable medium, or system, determining the service event affecting the one or more phone devices comprises transmitting, to a machine learning model trained to identify service events by evaluating patterns in data communicated over the telephony network via multiple customers of the software platform, a request to identify the service event, wherein the request includes the aggregated phone data; and receiving, from the machine learning model, the service event, wherein the service event corresponds to a pattern identified within the aggregated phone data.

In some implementations of the method, non-transitory computer readable medium, or system, determining the service event affecting the one or more phone devices comprises predicting the service event by identifying a trend from the aggregated phone data corresponding to at least one of call log information, active call information, jitter measurements, packet loss measurements, latency measurements, or software version information for the one or more phone devices.

In some implementations of the method, non-transitory computer readable medium, or system, the method comprises, the operations comprise, and the processing circuitry is configured to execute instructions for determining whether the service event corresponds to a high priority phone device of the one or more phone devices, wherein the high priority phone device is experiencing a poor call connection quality for; decreasing, in response to a determination the service event corresponds to the high priority phone device, network bandwidth available to a low priority phone device associated with the customer; and increasing network bandwidth available to the high priority phone device.

In some implementations of the method, non-transitory computer readable medium, or system, the method comprises, the operations comprise, and the processing circuitry is configured to execute instructions for collecting training data communicated over the telephony network via multiple customers of the software platform; and training a machine learning model to identify or predict service event using the training data.

In some implementations of the method, non-transitory computer readable medium, or system, the method comprises, the operations comprise, and the processing circuitry is configured to execute instructions for identifying, using a machine learning model trained to evaluate the aggregated phone data, a recommended action to perform to access the service event, wherein the recommended action corresponds to the service event; and outputting, to the graphical user interface, the recommended action.

In some implementations of the method, non-transitory computer readable medium, or system, the processing circuitry is configured to execute instructions to decrease, in response to the service event corresponds to a poor call connection quality for a high priority phone device of the one or more phone devices, a first network bandwidth available to a low priority phone device associated with the customer; and increase a second network bandwidth available to the high priority phone device, wherein the increase in the second network bandwidth corresponds to the decrease in the first network bandwidth.

In some implementations of the method, non-transitory computer readable medium, or system, the processing circuitry is configured to execute instructions to define, for the customer, a threshold corresponding to the service event, wherein the threshold corresponds to at least one of call log information, active call information, jitter measurements, packet loss measurements, latency measurements, or software version information for the one or more phone devices, wherein to determine the service event affecting the one or more phone devices the processing circuitry is configured to execute instructions to determining that the aggregated phone data exceeds the threshold.

In some implementations of the method, non-transitory computer readable medium, or system, to determine the service event affecting the one or more phone devices, the processing circuitry is configured to execute instructions to evaluating the aggregated phone data using a machine learning model trained to identify or predict service events based on patterns in the call connection quality for the one or more phone devices.

As used herein, unless explicitly stated otherwise, the term “location” may include various spatial definitions. A location can represent a broad geographic location (e.g., city, region, country, etc.), the physical site of a customer premises (e.g., office, factory, etc.), areas within the customer premises (e.g., floors, conference rooms, etc.), or even the placement of a specific phone device.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

aggregating, over a telephony network implemented by a software platform, phone data indicative of call connection quality for one or more phone devices associated with a customer of the software platform;

determining, based on the aggregated phone data, a service event affecting the one or more phone devices;

outputting, for display within a graphical user interface rendered at an administrator device of the customer, the aggregated phone data and a representation of the service event; and changing, based on an input received via the graphical user interface corresponding to the service event, one or more telephony network resources of the customer.

2. The method of claim 1, wherein determining the service event affecting the one or more phone devices comprises:

identifying, using a machine learning model trained to evaluate the aggregated phone data, a pattern in the call connection quality for the one or more phone devices; and corresponding, using the machine learning model, the pattern to the service event.

3. The method of claim 1, wherein determining the service event affecting the one or more phone devices comprises:

forecasting the service event by extrapolating a trend from the aggregated phone data.

4. The method of claim 1, wherein determining the service event affecting the one or more phone devices comprises:

determining that the aggregated phone data exceeds a threshold corresponding to the service event, wherein the threshold is defined for the customer.

5. The method of claim 1, comprising:

outputting, for display within the graphical user interface, a map illustration of a premises of the customer and locations of the one or more phone devices within the map illustration.

6. The method of claim 1, comprising:

training a machine learning model to identify or predict service events by evaluating patterns in data communicated over the telephony network via multiple customers of the software platform.

7. The method of claim 1, comprising:

determining a recommended action to perform to address the service event; and prompting, within the graphical user interface, for the input based on the recommended action.

8. The method of claim 1, wherein the service event corresponds to a poor call connection quality for a high priority phone device of the one or more phone devices, and wherein changing the one or more telephony network resources of the customer comprises:

decreasing network bandwidth available to a low priority phone device associated with the customer; and increasing network bandwidth available to the high priority phone device.

9. The method of claim 1, wherein the aggregated phone data corresponds to at least one of call log information, active call information, jitter measurements, packet loss measurements, latency measurements, or software version information for the one or more phone devices.

10. A non-transitory computer readable storage device including program instructions that, when executed by a processor cause the processor to perform operations, the operations comprising:

aggregating, over a telephony network implemented by a software platform, phone data indicative of call connection quality for one or more phone devices associated with a customer of the software platform;

determining, based on the aggregated phone data, a service event affecting the one or more phone devices;

outputting, for display within a graphical user interface rendered at an administrator device of the customer, the aggregated phone data and a representation of the service event; and changing, based on an input received via the graphical user interface corresponding to the service event, one or more telephony network resources of the customer.

11. The non-transitory computer readable storage device of claim 10, the operations further comprising;

generating a map of a premises of the customer, wherein the map includes locations of the one or more phone devices; and outputting the map to the graphical user interface.

12. The non-transitory computer readable storage device of claim 10, wherein determining the service event affecting the one or more phone devices comprises:

transmitting, to a machine learning model trained to identify service events by evaluating patterns in data communicated over the telephony network via multiple customers of the software platform, a request to identify the service event, wherein the request includes the aggregated phone data; and receiving, from the machine learning model, the service event, wherein the service event corresponds to a pattern identified within the aggregated phone data.

13. The non-transitory computer readable storage device of claim 10, wherein determining the service event affecting the one or more phone devices comprises:

predicting the service event by identifying a trend from the aggregated phone data corresponding to at least one of call log information, active call information, jitter measurements, packet loss measurements, latency measurements, or software version information for the one or more phone devices.

14. The non-transitory computer readable storage device of claim 10, the operations further comprising:

determining whether the service event corresponds to a high priority phone device of the one or more phone devices, wherein the high priority phone device is experiencing a poor call connection quality for;

decreasing, in response to a determination the service event corresponds to the high priority phone device, network bandwidth available to a low priority phone device associated with the customer; and increasing network bandwidth available to the high priority phone device.

15. A system, comprising:

a memory subsystem configured to store instructions; and processing circuitry configured to execute instructions to:

aggregate, over a telephony network implemented by a software platform, phone data indicative of call connection quality for one or more phone devices associated with a customer of the software platform;

determine, based on the aggregated phone data, a service event affecting the one or more phone devices;

output, for display within a graphical user interface rendered at an administrator device of the customer, the aggregated phone data and a representation of the service event; and change, based on an input received via the graphical user interface corresponding to the service event, one or more telephony network resources of the customer.

16. The system of claim 15, wherein the processing circuitry is configured to execute instructions to:

collect training data communicated over the telephony network via multiple customers of the software platform; and train a machine learning model to identify or predict service event using the training data.

17. The system of claim 15, wherein the processing circuitry is configured to execute instructions to:

identify, using a machine learning model trained to evaluate the aggregated phone data, a recommended action to perform to access the service event, wherein the recommended action corresponds to the service event; and output, to the graphical user interface, the recommended action.

18. The system of claim 15, wherein the processing circuitry is configured to execute instructions to:

decrease, in response to the service event corresponds to a poor call connection quality for a high priority phone device of the one or more phone devices, a first network bandwidth available to a low priority phone device associated with the customer; and increase a second network bandwidth available to the high priority phone device, wherein the increase in the second network bandwidth corresponds to the decrease in the first network bandwidth.

19. The system of claim 15, wherein the processing circuitry is configured to execute instructions to:

define, for the customer, a threshold corresponding to the service event, wherein the threshold corresponds to at least one of call log information, active call information, jitter measurements, packet loss measurements, latency measurements, or software version information for the one or more phone devices, wherein to determine the service event affecting the one or more phone devices the processing circuitry is configured to execute instructions to:

determining that the aggregated phone data exceeds the threshold.

20. The system of claim 15, wherein, to determine the service event affecting the one or more phone devices, the processing circuitry is configured to execute instructions to:

evaluating the aggregated phone data using a machine learning model trained to identify or predict service events based on patterns in the call connection quality for the one or more phone devices.

* * * * *